Figure 1:
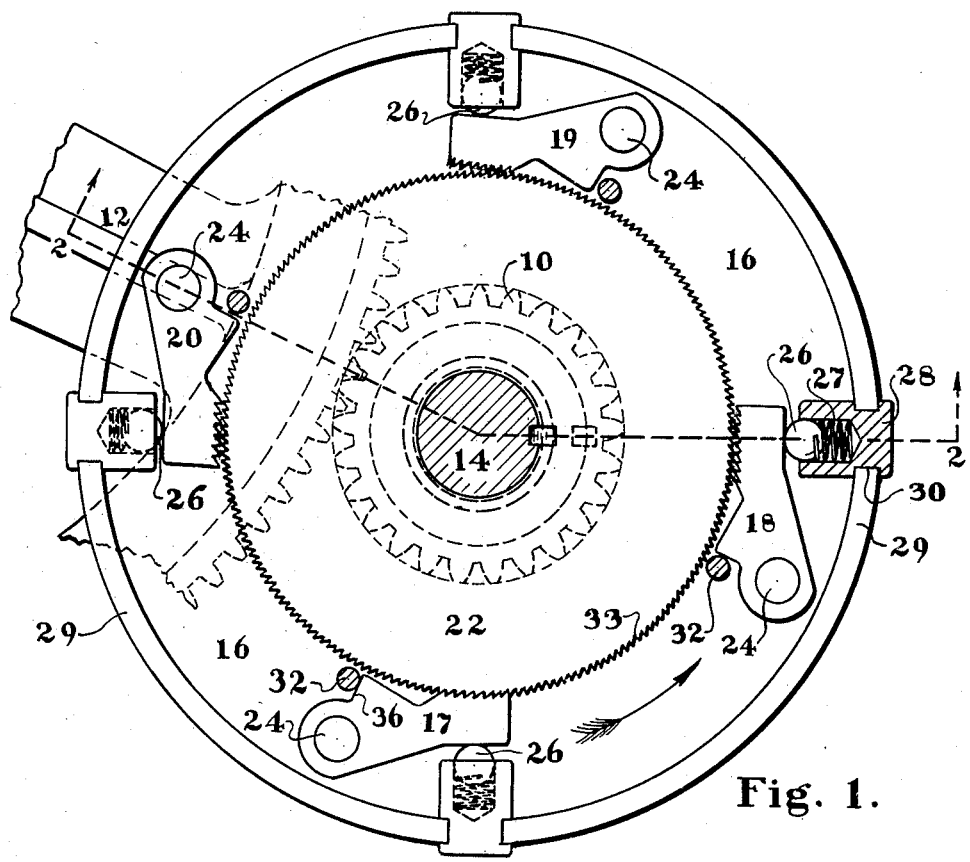

March 21, 1939.   W. H. BLOUNT   2,151,417

POWER DRIVING MECHANISM

Filed April 1, 1937

Inventor
William H. Blount

Patented Mar. 21, 1939

2,151,417

UNITED STATES PATENT OFFICE 2,151,417

POWER DRIVING MECHANISM

William H. Blount, Worcester, Mass., assignor of one-half to Sleeper & Hartley, Incorporated, Worcester, Mass., a corporation of Massachusetts Application April 1, 1937, Serial No. 134,255

2 Claims. (Cl. 74—576)

This invention relates to a power driving mechanism adapted to convert a reciprocatory motion into an intermittent unidirectional rotary motion.

In the spring coiling machine shown in the patent to Sleeper No. 1,266,070 of May 14, 1918, the wire coiling mechanism is operated intermittently by means of a reciprocating gear segment and pawl and ratchet mechanism which transmits an interrupted rotary, unidirectional motion to the wire driving mechanism. In that type of wire coiling machine, the wire is stopped periodically in its forward movement and a wire cutter is operated by a cam rotating in timed relation with the ratchet; hence any lost motion in the ratchet mechanism will affect the amount of wire fed to the coiler or the length of the coil. This mechanical movement is required to transmit a considerable amount of power in the operation of wire coiling, hence the teeth of the ratchet gear and pawl must be substantial in size. Consequently, the teeth are made comparatively large and with a wide tooth spacing, so that the single driving pawl may have to move an appreciable distance before it meshes properly with the ratchet teeth and thus result in a considerable lost motion and vary the length of the coil.

The primary object of this invention is to provide a mechanical movement of this type which will minimize the lost motion in the operation of the ratchet mechanism, whereby a reciprocating member may rotate a driving shaft intermittently in one direction and cause the shaft to start into motion as soon as the reciprocation movement changes. Further objects will be apparent in the following disclosure.

Figure 2:
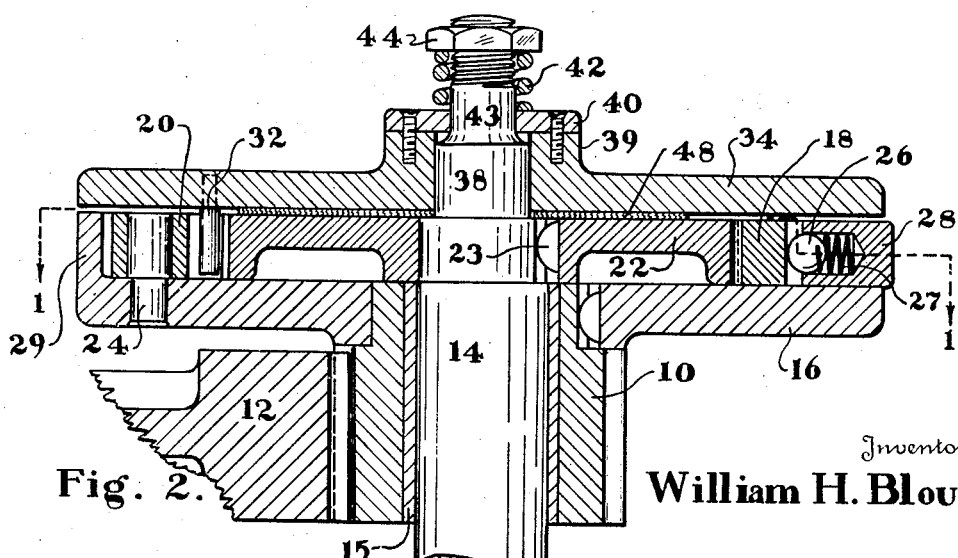

Referring to the drawing illustrating one embodiment of this invention which is particularly capable of use in a wire coiling machine:

Fig. 1 is a sectional view, partly broken away, taken on the line 1—1 of Fig. 2 showing a ratchet mechanism driven by a gear segment; and Fig. 2 is a similar sectional view on the line 2—2 of Fig. 1.

In accordance with one phase of this invention, I provide a ratchet mechanism with a plurality of driving pawls which are arranged to divide the tooth spacing of the ratchet substantially equally so that only one pawl will be in mesh with the ratchet at a given time; and this is preferably accomplished by spacing the pawls at equidistances around the periphery of the ratchet and providing the ratchet with one more or one less in number of teeth than would be found on the pawls if they presented a continuous periphery. Hence, if there are four pawls equally spaced at 90° apart, these will divide the space between the noses of two ratchet teeth into four parts, and the driving plate carrying the four pawls will have to move only one-quarter of the distance between the two teeth before one of the pawls will slip into place and be properly in mesh for driving the ratchet member. A further feature of the invention involves the provision of mechanism which moves one of the pawls quickly into driving engagement with the ratchet when driven in one direction, but which quickly releases the pawl from driving engagement when it starts moving in the other direction and holds all of the pawls out of contact with the ratchet teeth during such reverse motion, so that lost motion is largely eliminated.

In the construction illustrated, the pinion 10 is rotated intermittently in opposite directions by means of the reciprocating gear segment 12 or other suitable mechanism, such as a rack bar. This gear segment may be suitably mounted on a pivot and moved back and forth by an eccentric or crank mechanism of the type illustrated in the patent to Sleeper No. 1,266,070, and the eccentric may be suitably operated by a constantly rotating shaft operating in timed relation with the cutter cam and other parts of the machine. The reciprocatory motion of the segment 12 is transmitted through the pinion 10 to the driven shaft 14 by means of the ratchet and pawl mechanism illustrated. For this purpose, the gear 10 is freely mounted on the shaft 14 with an intermediate bushing 15 therebetween which serves as a bearing so that the pinion may freely rotate about the shaft. Coaxial with the shaft is a driving plate or pawl carrier 16, which is mounted on a reduced end of the gear 10 and keyed thereto so that the two parts will rotate in unison. This carrier has pivotally mounted thereon a set of driving pawls 17, 18, 19 and 20 having one or a plurality of teeth which are arranged to project over the periphery of a ratchet wheel 22 and to mesh therewith at suitable times for driving the same. This ratchet wheel is mounted close to the inner plane face of the pawl carrier 16 and is adapted to rotate coaxially therewith. For this purpose, the ratchet wheel 22 is mounted on a reduced portion of the shaft 14 and secured thereto by the key 23. Consequently, when the ratchet wheel is driven by one of the pawls meshing therewith, this plate will rotate the central shaft in a forward direction. The ratchet teeth and pawls are so arranged that the shaft 14 will remain stationary while the pinion 10 and pawl carrier 16 are rotated in a reverse direction.

In the embodiment illustrated, there are four of the pawls spaced at 90° apart and arranged so that only one pawl will mesh with the ratchet plate at a given time. Each pawl is pivotally mounted on a pin 24 projecting laterally from and suitably secured to the pawl carrier 16. The pin is of such length and radial distance from the shaft axis that each pawl is located in proper position close to the peripheral teeth of the ratchet wheel. In order to move the pawls into driving engagement with the ratchet wheel, I provide a set of spring pressed plungers, each of which may comprise a ball 26 held by means of a spring 27 against the outer face of the pawl. The spring and ball are mounted in a socket within a metal piece 28 suitably secured on the driving plate 16. The driving plate 16 may be provided with a flange 29, which is slotted as shown in Fig. 1 so as to slidably fit into slots 30 on the sides of the hollow metal pieces 28 and hold them in place.

The teeth of the ratchet wheel 22 are made as large and strong as is necessary for the purpose, and the teeth on the four pawls are made as above explained so that only one can enter into driving engagement with the ratchet wheel 22 at a time. The pawls are spaced at 90° apart as illustrated, so that due to the tooth spacing only one of the pawls 17 meshes with the ratchet teeth in the arrangement illustrated, while the other pawls 18, 19 and 20 are held in engagement with the tops of the ratchet teeth by the spring pressed balls 26 but do not assist in driving the ratchet wheel 22. In this arrangement, the pawls are equally spaced about the ratchet wheel periphery, and since there is one more or one less in number of teeth on the ratchet wheel than is represented by the tooth spacing on the pawls, one pawl will be nearest to a meshing position when a reverse motion of the gear segment starts and this pawl will drop into place, while the others will occupy positions representing one quarter, one half and three quarters of the spacing between the adjacent noses of the ratchet teeth. It will also be appreciated that the ratchet and pawls may have the same tooth spacing and relative numbers of teeth, but the pawls may be located in advance of their 90° positions by distances of one, two and three quarters of a tooth spacing respectively. If six or eight or more pawls are employed, then that will serve to divide the spacing between the tops of two teeth still more finely. Consequently, when the driving plate 16 starts to rotate in the direction of the arrow shown in Fig. 1, the maximum movement required of any one of the pawls before it engages the ratchet 22 is one quarter, or one sixth or one eighth of the total distance between the centers of two teeth, depending upon the number of pawls. This construction, therefore, insures that there is but little lost motion between the driving plate 16 and the driven ratchet 22 and its shaft 14.

When the segment 12 is moved in the reverse, non-driving direction by the crank or eccentric which drives it, then the pawls are intended to be thrown quickly out of engagement with the ratchet and to remain thus while the shaft 14 is stationary. This is accomplished by means of the pins 32 which are suitably mounted on a friction plate 34 in such positions in the paths of the pawls that they will engage radial shoulders 36 on the pawls when the plate 16 and its pawls start in the direction opposite to that of the arrow shown in Fig. 1. Each pin 32 lies in close association with the shoulder 36 on the pawl when the pawl is in engagement with the ratchet wheel 22, as shown for the pawl 17 at the bottom of Fig. 1, so that when the pawl carrier 16 starts in the opposite direction to that of the arrow, there will be as little lost motion as possible in getting the pawl teeth out of contact with the ratchet teeth. The ratchet teeth 33 are, however, faced in one direction, as illustrated, so that the ratchet plate will not be driven by the reverse motion.

In order to cause the pins 32 to function as above described, the friction plate 34 is freely mounted on the reduced portion 38 of the shaft 14, and it is provided with a central hub 39 and a cap 40. As shown in Fig. 2, there is a slight clearance between the cap 40 and the shoulder of the reduced portion 38 of the shaft to take care of wear in the device. A spring 42 surrounds the threaded reduced end 43 of the shaft and is held in place by a nut 44, whereby the spring tends to force the plate 34 towards the face of the ratchet wheel 22. Interposed between the plate 34 and the ratchet wheel 22 is a friction disk 48 made of suitable material, such as fiber board. This disk 48 is of such dimensions that it engages only the adjacent plane faces of the ratchet wheel 22 and the plate 34; and because of the force of the spring 42 applied thereagainst the plate 34 tends to rotate with the ratchet wheel or to remain stationary when the latter is not moving. It will be understood that the fibre disk may be either loose or secured to the ratchet wheel or to the plate 34, and that any suitable construction may be employed to cause the friction plate 34 to operate as described. In so far as the operation is concerned, the friction plate may be considered as faced with the friction material of the fibre disk.

Consequently, because of this construction, the friction plate 34 will move with the ratchet wheel in a forward direction, but when the driving plate 16 stops going in the direction of the arrow, the ratchet wheel 22 also stops and this holds the friction plate 34 and its pins 32 stationary. When the reverse movement of the plate 16 starts, it thrusts the shoulder 36 of each of the pawls against the adjacent pin 32 and this stationary pin serves to lift the pawl 17 out of contact with the ratchet teeth 33 against the pressure of the spring 27. Thereafter, the plate 16 continues in its reverse direction, while the ratchet wheel 22 and shaft 14 remain stationary. But the plate 34, under the driving force of the pawls going in the opposite direction, is forced by the pins 32 to rotate against the friction of the fibrous material 48 until the gear segment 12 has reached the end of its stroke. Then, when the gear segment reverses again in direction, the driving plate 16 will immediately start in the direction of the arrow, and that one of the pawls which is nearest to a meshing engagement with the ratchet 22 will be forced quickly into that position by its associated spring 27, while the other pawls will rest idly upon the tops of the ratchet teeth. This forward motion released the pressure on the pin 32, and during the forward stroke the back plate 34 will rotate again with the ratchet wheel 22 and the driven shaft 14.

It will now be apparent that this construction permits one to obtain a powerful intermittent drive by means of a simple and efficient ratchet mechanism, in which the lost motion involved in meshing the pawl and ratchet may be reduced to a desired extent without reducing the size of the driving teeth. The device has but a minimum of parts and can be cheaply and easily constructed. By its use, I insure that wire coils will be cut to substantially the same lengths during the entire operation of the machine. The precision and accuracy of the machine may be adjusted as desired by varying the number of the pawls and the tooth spacing. It will also be understood that various changes may be made in the construction within the mechanical knowledge of one skilled in the art and that all such changes as lie within the scope of the appended claims are intended to be covered thereby.

Having thus described my invention, what I claim as new and protectable by Letters Patent is:

1. A power mechanism for converting a reciprocatory motion into an intermittent, uni-directional, rotary motion comprising a fine toothed ratchet wheel and a pawl carrier which are relatively rotatable about a common axis, means including a driven gear rotatable about said axis for revolving one of said members as a driver alternately in opposite directions, a plurality of pawls on said carrier which are so constructed and arranged as to divide the tooth spacing of the ratchet so that but one pawl can mesh with a ratchet tooth at a given time, a spring resiliently engaging each of the pawls and tending to force the same quickly into mesh with the ratchet teeth, a friction member having an extensive friction surface engaging a side face of the ratchet wheel and which rotates coaxially with the ratchet wheel and carrier in the forward direction while the pawl and ratchet teeth are in driving engagement but which rotates with the driver and slips relative to the driven member during a reverse motion, and means on the friction plate projecting into the path of the pawls which causes a reverse rotation of the driver to lift and hold the pawls out of engagement with the ratchet wheel.

2. A power mechanism for converting a reciprocatory motion into an intermittent, uni-directional, rotary motion comprising a shaft, a ratchet wheel rotatable with the shaft, a pawl carrier mounted on and freely rotatable relative to the shaft, means including a driven gear concentric with the shaft axis for rotating one of said members as a driver intermittently in opposite directions, a pawl on the carrier arranged for driving engagement with the ratchet teeth, a spring tending to hold the pawl in engagement therewith during a forward driving motion, a friction plate mounted on the shaft and rotatable coaxially with and having an extensive friction surface on one side engaging an adjacent side of the ratchet wheel so that the two rotate together during a forward driving movement, and a peg on the friction plate projecting into the path of the pawl and arranged to lift it out of driving engagement with the ratchet wheel during a reverse motion of the driver and to cause the friction plate to slip relative to the ratchet wheel when the driven member is stationary.

WILLIAM H. BLOUNT.